United States Patent
Yamada et al.

(10) Patent No.: US 7,430,057 B2
(45) Date of Patent: Sep. 30, 2008

(54) APPARATUS ADMINISTRATION SYSTEM

(75) Inventors: Kei Yamada, Tokyo (JP); Kunio Shijo, Tokyo (JP); Tetsuo Kimoto, Tokyo (JP); Tomoya Yoshida, Tokyo (JP)

(73) Assignee: Konica Corporation, Tokyo (JP)

( * ) Notice: Subject to any disclaimer, the term of this patent is extended or adjusted under 35 U.S.C. 154(b) by 5 days.

(21) Appl. No.: 11/528,106

(22) Filed: Sep. 27, 2006

(65) Prior Publication Data

US 2007/0019238 A1   Jan. 25, 2007

Related U.S. Application Data

(63) Continuation of application No. 09/881,925, filed on Jun. 14, 2001, now Pat. No. 7,123,372.

(30) Foreign Application Priority Data

Jun. 22, 2000   (JP)   ............... 2000-187463

(51) Int. Cl.
*G06K 15/00*   (2006.01)
*G06F 3/12*   (2006.01)
(52) U.S. Cl. .............. 358/1.15; 358/1.13; 358/1.14
(58) Field of Classification Search ............... 358/1.15, 358/402, 403, 1.14, 1.13, 1.1, 1.16, 1.17, 358/1.18, 1.9, 407, 468, 437; 709/201, 202, 709/203, 217, 218, 220, 221, 206, 239; 379/100.01, 379/100.05, 100.09
See application file for complete search history.

(56) References Cited

U.S. PATENT DOCUMENTS 5,414,494 A   5/1995   Aikens (Continued)

FOREIGN PATENT DOCUMENTS

EP   0 478 343 A2   4/1992

(Continued)

OTHER PUBLICATIONS

Noaki Ura et al: "Remote Maintenance Function For Distributed Control System", Advances in Instrumentation and Control, Instrument Society of America, Research Triangle Park, U.S., vol. 48, No. Part 3, 1993, pp. 1557-1564, XP000428425, ISSN: 1054-0032—entire document.

(Continued)

*Primary Examiner*—Dov Popovici
(74) *Attorney, Agent, or Firm*—Frishauf, Holtz, Goodman & Chick, P.C.

(57) ABSTRACT

An image forming apparatus administration system is provided which includes an image forming apparatus, which is located in a first local network and connected to the Internet through a first firewall server, an administration computer, which is located in a second local network and connected to the Internet through a second firewall server, and a relaying server, which is located outside the first local network and the second local network and is connected to the Internet. The administration computer transmits information for administrating the image forming apparatus to the relaying server, and accesses the relaying server to obtain information corresponding to a state of the image forming apparatus. The image forming apparatus accesses the relaying server at a predetermined timing to obtain the information from the administrating computer, and transmits the information corresponding to the state of the image forming apparatus to the relaying server.

46 Claims, 9 Drawing Sheets

U.S. PATENT DOCUMENTS

| | | |
|---|---|---|
| 5,580,177 A | 12/1996 | Gase et al. |
| 5,748,880 A | 5/1998 | Ito et al. |
| 5,819,110 A | 10/1998 | Motoyama |
| 5,828,864 A | 10/1998 | Danknick et al. |
| 5,878,256 A | 3/1999 | Bealkowski et al. |
| 5,887,216 A | 3/1999 | Motoyama |
| 5,893,005 A | 4/1999 | Ogura |
| 6,031,623 A | 2/2000 | Smith et al. |
| 6,240,456 B1 | 5/2001 | Teng et al. |
| 6,337,745 B1 | 1/2002 | Aiello, Jr. et al. |
| 6,362,870 B2 | 3/2002 | Mui et al. |
| 6,384,926 B2 | 5/2002 | Mochizuki |
| 6,473,788 B1 | 10/2002 | Kim et al. |
| 6,490,052 B1 | 12/2002 | Yanagidaira |
| 6,519,053 B1 | 2/2003 | Motamed et al. |
| 6,618,162 B1 | 9/2003 | Wiklof et al. |
| 6,633,400 B1 | 10/2003 | Sasaki et al. |
| 6,714,971 B2 | 3/2004 | Motoyama et al. |
| 6,788,429 B1 | 9/2004 | Clough et al. |
| 6,791,702 B2 | 9/2004 | Tanaka |
| 6,862,583 B1 | 3/2005 | Mazzagatte |
| 6,918,082 B1 | 7/2005 | Gross et al. |
| 2001/0054064 A1 | 12/2001 | Kannan |
| 2002/0103901 A1 | 8/2002 | Yoshida |
| 2003/0208569 A1 | 11/2003 | O'brien et al. |
| 2004/0012807 A1 | 1/2004 | Konishi |
| 2005/0280864 A1 | 12/2005 | Lodwick |

FOREIGN PATENT DOCUMENTS

| | | |
|---|---|---|
| EP | 0 843 230 A2 | 5/1998 |
| EP | 1 033 646 A2 | 9/2000 |
| JP | 10-322396 | 4/1998 |

OTHER PUBLICATIONS

"Disk Drive With Embedded Hyper-Text Markup Language Server", IBM Technical Disclosure Bulletin, IBM Corp., New York, U.S., Dec. 1, 1995, p. 479, XP000588211—entire document.

The Hard Copy Observer, vol. VII, No. 3, Mar. 1997, pp. 45-48.

"Integration management tool Patrol"business communication, Business Communication Limited Company, Feb. 1, 1999, vol. 36, No. 2, pp. 134-143.

Ryuich Toriyama "System security and operation management" Nikkei Open System, Nikkei BP Company, Dec. 15, 1997, vol. 57, pp. 326-332.

FIG. 3

EXAMPLES OF INHERENT DATA

| | COUNT NAME | DETAILED EXPLANATION |
|---|---|---|
| COUNT-RELATED INFORMATION (COUNT FOR MACHINE MAINTENANCE AND ACCOUNTING) | TOTAL COUNT | TOTAL COUNT OF COPIED OR PRINTED TRANSFER SHEETS |
| | COUNT BY PAPER SIZE | COUNT BY THE SIZE OF USED TRANSFER PAPER |
| | COUNT BY DEPARTMENT (INDIVIDUAL) | COUNT BY USER DEPARTMENT (INDIVIDUAL) |
| | COUNT BY COPY, PRINTER, FAX AND SCANNER | COUNT OF USES BY MODE |
| | COUNT BY USER UTILIZATION MODE | COUNT BY MODE EMPLOYED BY THE USER (SIMPLEX/DUPLEX, STAPLE, ETC.) |
| | NUMBER OF ADF SHEETS FED | NUMBER OF COPIED DOCUMENTS PASSING THROUGH THE ADF |
| | PM COUNT | COUNT AS A REFERENCE FOR PERIODIC INSPECTION BY CE |
| | DRUM COUNT | COUNT OF DRUM USES |
| | OPTIONAL REPLACEMENT PARTS COUNT | COUNT OF USES OF THE PARTS WHICH CAN BE ASSIGNED OPTIONALLY BY CE (EMPLOYED AS A REFERENCE FOR REPLACEMENT INTERVAL) |
| | FIXED REPLACEMENT PARTS COUNT | COUNT OF USES OF THE PARTS DETERMINED AT THE TIME OF SHIPMENT FROM THE FACTORY (EMPLOYED AS A REFERENCE FOR REPLACEMENT INTERVAL) |
| INFORMATION FOR COPIER IDENTIFICATION (INFORMATION FOR IDENTIFICATION AND MANAGEMENT OF THE COPIER) | SERIAL NUMBER OF THE MAIN BODY | BASIC MACHINE MANUFACTURING NUMBER |
| | OPTIONAL SERIAL NUMBER | OPTIONAL MANUFACTURING NUMBER |
| | OPTIONAL CONFIGURATION INFORMATION | OPTIONAL INSTALLATION CONFIGURATION INFORMATION |
| | MAIN ROM VERSION | CONTROL PROGRAM VERSION INFORMATION |
| | OPTIONAL ROM VERSION | CONTROL PROGRAM VERSION INFORMATION |
| EMERGENCY AND REGULAR CALL INFORMATION (HOST CALL INFORMATION) | COUNT AT THE TIME OF EMERGENCY AND REGULAR CALL | TOTAL COUNT OF COPIER AT THE TIME OF HOST CALL |
| | DATE AND TIME FOR EMERGENCY AND REGULAR CALL | DATE AND TIME FOR HOST CALL |
| | DETAILS OF EMERGENCY AND REGULAR CALL | DETAILS OF HOST CALL |
| REGULAR CALL SETTING INFORMATION (SETTING INFORMATION FOR REGULAR CALL) | REGULAR COUNT CALL SETTING | SETTING INFORMATION TO CALL HOST FOR EACH REGULAR COUNT |
| | REGULAR CALL OF DATE AND TIME | SETTING INFORMATION TO CALL HOST FOR REGULAR DATE AND TIME |
| JAM/SC INFORMATION (PAPER JAMMING AND SERVICE CALL INFORMATION) | JAM/S COUNT | NUMBER OF OF OCCURRENCES OF JAM/SC |
| | DATE AND TIME OF OCCURRENCE OF JAM/SC | DATE AND TIME WHEN JAM/SC OCCURS |
| | JAM/SC DESCRIPTION | INFORMATION ON THE PLACE WHERE JAM/SC HAS OCCURRED |
| | JAM/SC LOG | HISTORICAL INFORMATION ON THE DATE AND TIME OF OCCURRENCE OF JAM/SC AND THE DETAILS |
| ADJUSTMENT DATA (PARAMETER FOR EACH CONTROL) | MACHINE ADJUSTMENT DATA | MACHINE CONTROL PARAMETER (QUALITY CONTROL) |
| | SETTING OF FAX COMMUNICATIONS FUNCTION | FAX COMMUNICATIONS PARAMETER |
| | SYSTEM SETUP DATA | REMOTE CONTROL SYSTEM PARAMETER |
| COMMUNICATIONS LOG | COMMUNICATIONS MANAGEMENT REPORT | FAX/REMOTE DIAGNOSIS COMMUNICATIONS LOG INFORMATION |
| USER SETUP DATA | USER SETUP DATA | DATA SET BY THE USER (SUCH AS ABBREVIATED DIALING) |
| VARIOUS SETUP DATA | HOST SELECTION NUMBER | SELECTION INFORMATION OF TELEPHONE NUMBER, IP ADDRESS, URL, ETC. |
| | IDENTIFICATION PASSWORD | RELATED MACHINE AND HOST IDENTIFICATION PASSWORD FOR SECURITY |

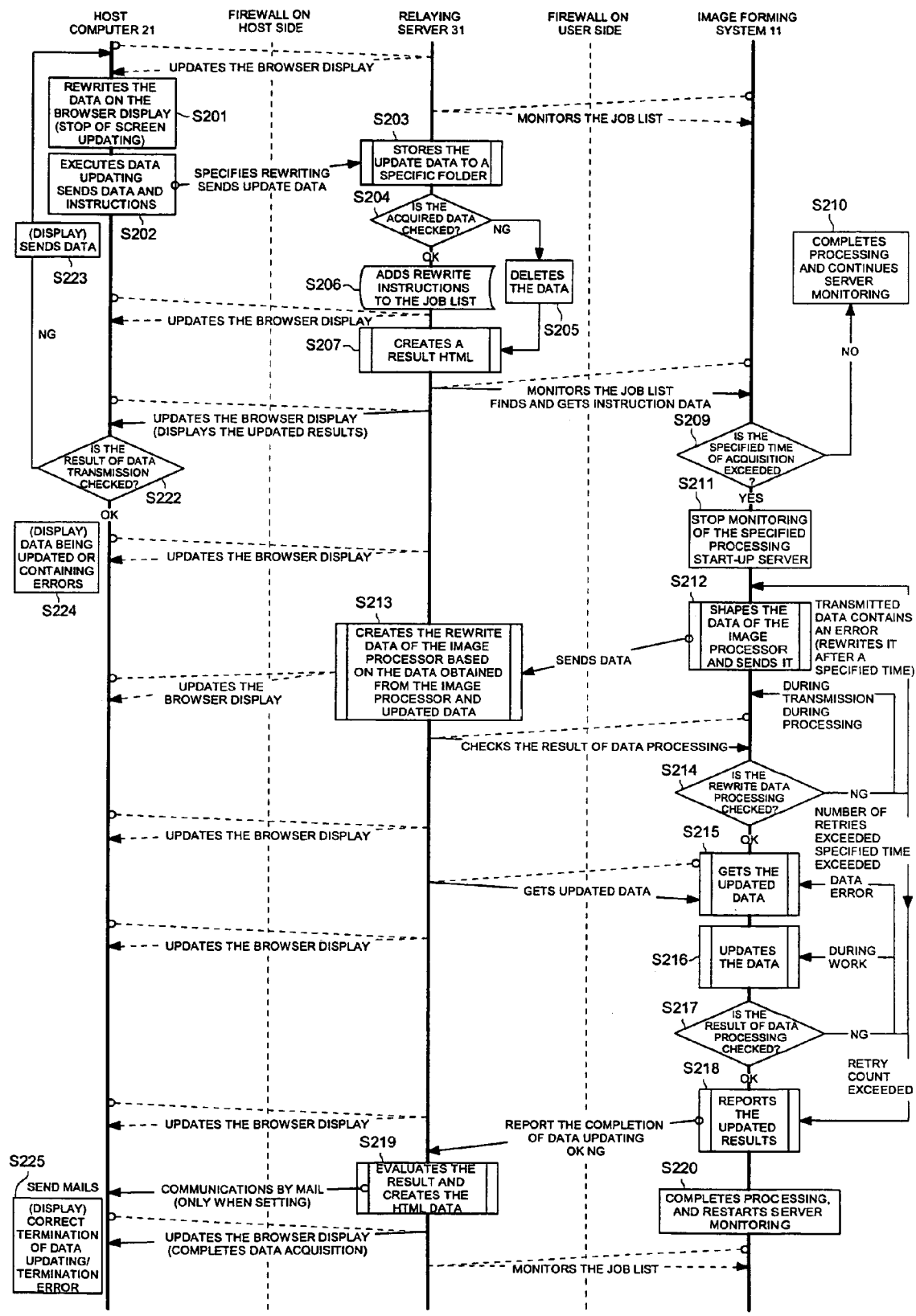
FIG. 4  PROCEDURES TO UPDATE DATA INHERENT TO THE IMAGE PROCESSOR

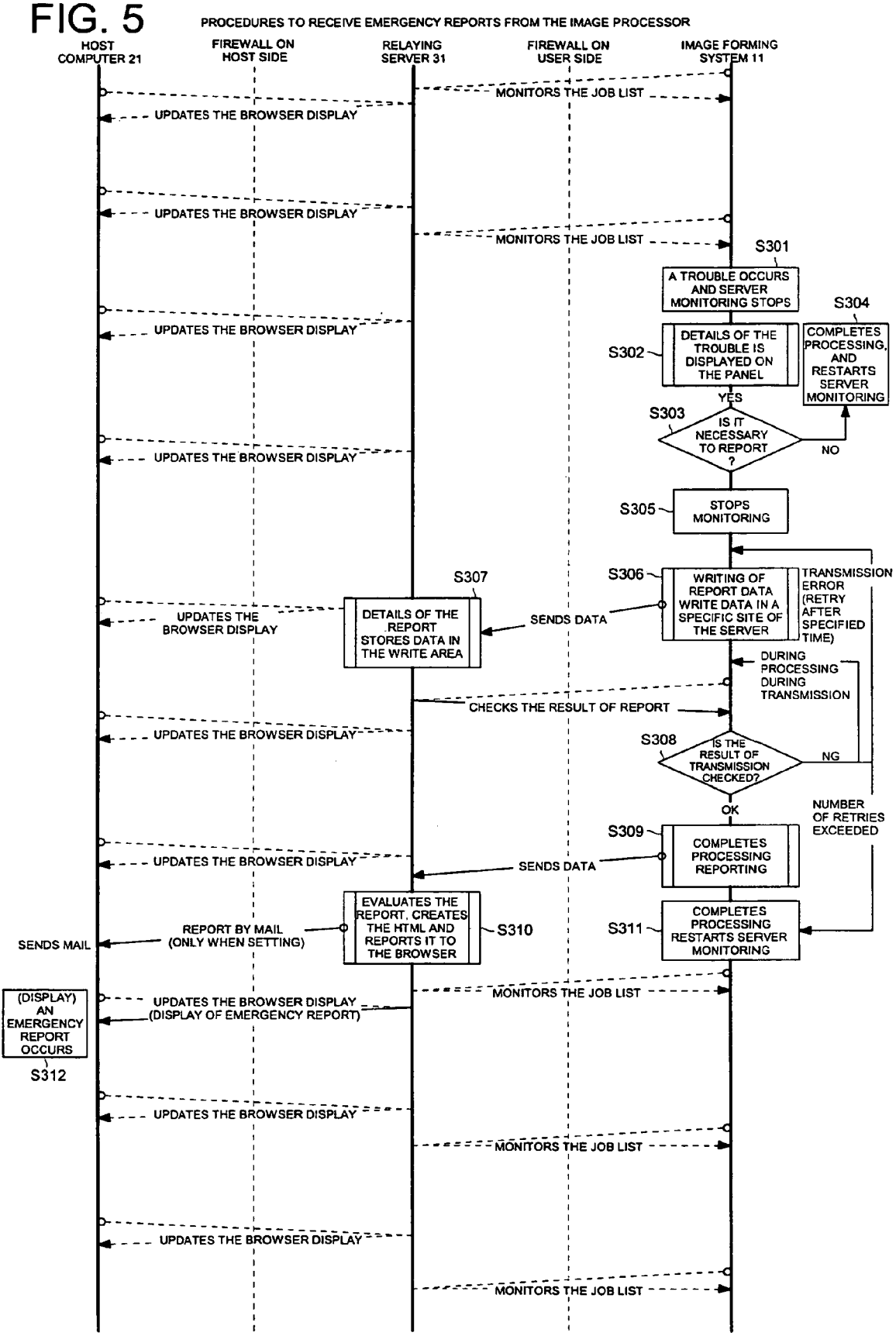

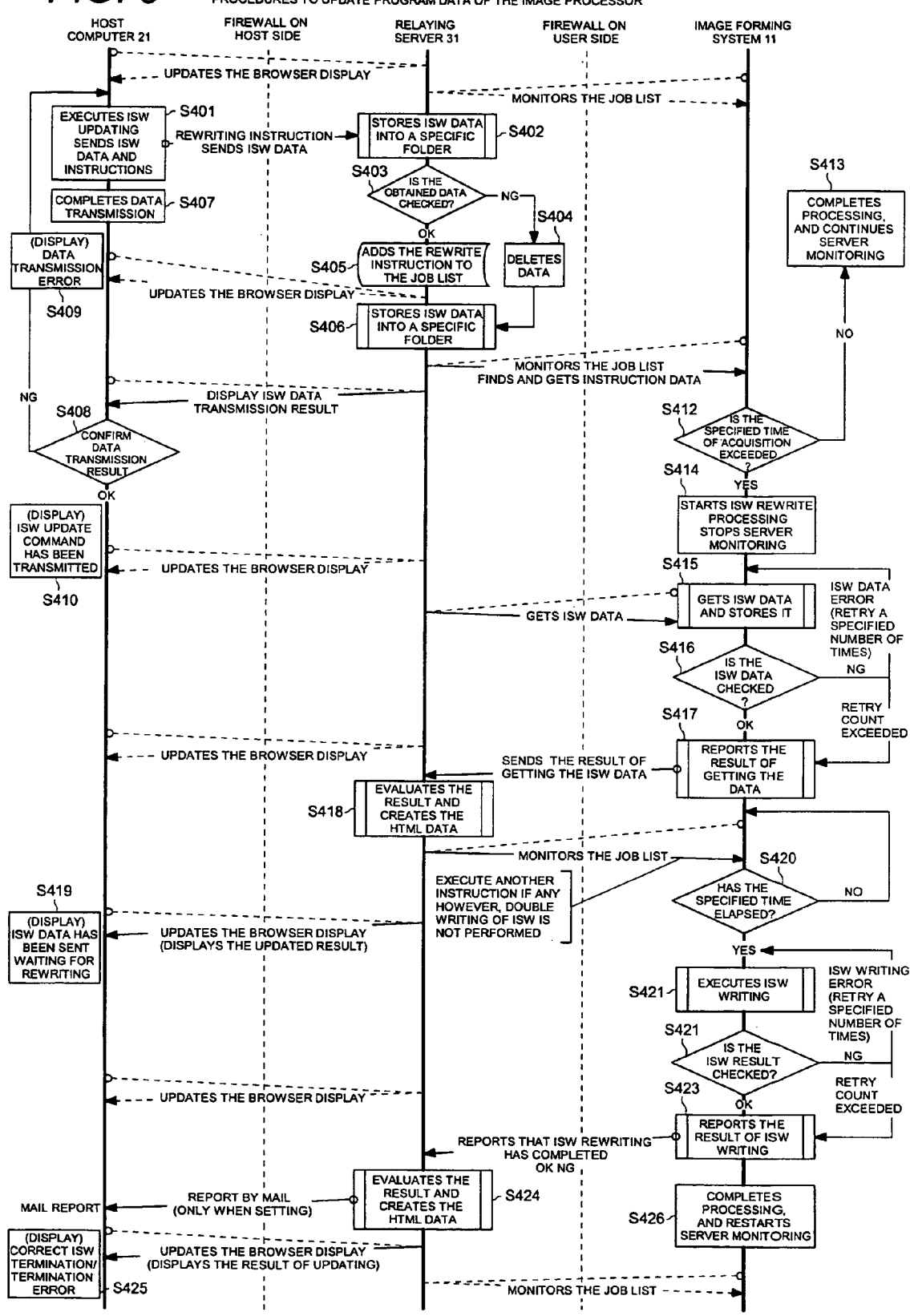

APPARATUS ADMINISTRATION SYSTEM

The present application is a Continuation Application of Ser. No. 09/881,925, filed Jun. 14, 2001 now U.S. Pat. No. 7,123,372 the entire contents of which are incorporated herein by reference.

BACKGROUND OF THE INVENTION

The present invention relates to the administration technique capable of administering a device to be administered via the Network.

An example of such an art is found in the prior art for remote monitoring of an image forming apparatus including a copier as a device to be administered. To put it more specifically, a copier and an administration center are connected by a wired or wireless public line. If a trouble has occurred to a copier, it is reported to the administration center from said copier.

Said art allows the administration center to keep track of the status of the copier at all times without the user having to reporting the trouble of a copier to the administration center. This makes it possible to take a quick action in response to the trouble.

In this connection, it would be a great benefit if intensive administration of many copiers can be provided at the administration center. In such a case, if remote rewriting of configuration settings of the copier or execution program, for example, is possible, then maintenance time and expenses will be cut down accordingly. However, the amount of information to be conveyed is limited according to the prior art. Hence, if said intensive administration is to be realized, an information transmission means capable of carrying a great amount of information is indispensable. In response to this demand, there has been a rapid growth of networks such as the Internet in recent years. This allows simultaneous multiple access by packet communications and provides economic advantages as well. To ensure an intensive administration of a great many copiers, use of such a network is preferred.

However, in order to ensure communications security, many of general business corporations configure the firewall server between the intra-company LAN and out-company Internet as a user network in an effort to protect themselves against illegal access from outside. In such cases, the administration center cannot access the in-house copier to read information therefrom (for administration of the copier status).

To resolve this problem, it is theoretically possible to change the setting of the firewall server and to permit access only from the administration center. However, it is impossible in practice to change the firewall server setting only for copier maintenance due to the security and related problems. However, many users do not prefer this idea because security by firewall server will be undermined if access from the administration center is permitted.

SUMMARY OF THE INVENTION

The present invention has been developed to resolve these problems. It is intended to provide an administration system and administration method which keep track of the status of the device to be administered by utilizing the network including the Internet, independently of the presence or absence of firewall server.

This objective is achieved by an image forming apparatus administration system, including: an image forming apparatus, located in the first local network and connected to the Internet through the first firewall server of the first local network; an administration computer, located in the second local network and connected to the Internet through the second firewall server of the second local network; a relaying server, located outside the first local network and the second local network, connected to the Internet and including a relaying storage; in which the administration computer at least transmits first passing information for administrating the image forming apparatus by accessing the relaying server or receives second passing information, corresponding a state of the image forming apparatus and stored in the relaying storage of the relaying server; and the image forming apparatus executes an access to the relaying server at a predetermined timing so as to obtain the first passing information, stored in the relaying storage, or to transmit the second passing information.

BRIEF DESCRIPTION OF THE DRAWINGS

FIG. 3 is a drawing representing an example of inherent data.

FIG. 4 is a ladder diagram representing exchange of data between image forming apparatus 11 and host computer 21.

FIG. 5 is a ladder diagram representing exchange of data between image forming apparatus 11 and host computer 21.

FIG. 6 is a ladder diagram representing exchange of data between image forming apparatus 11 and host computer 21.

DETAILED DESCRIPTION OF THE INVENTION

Figure 1:
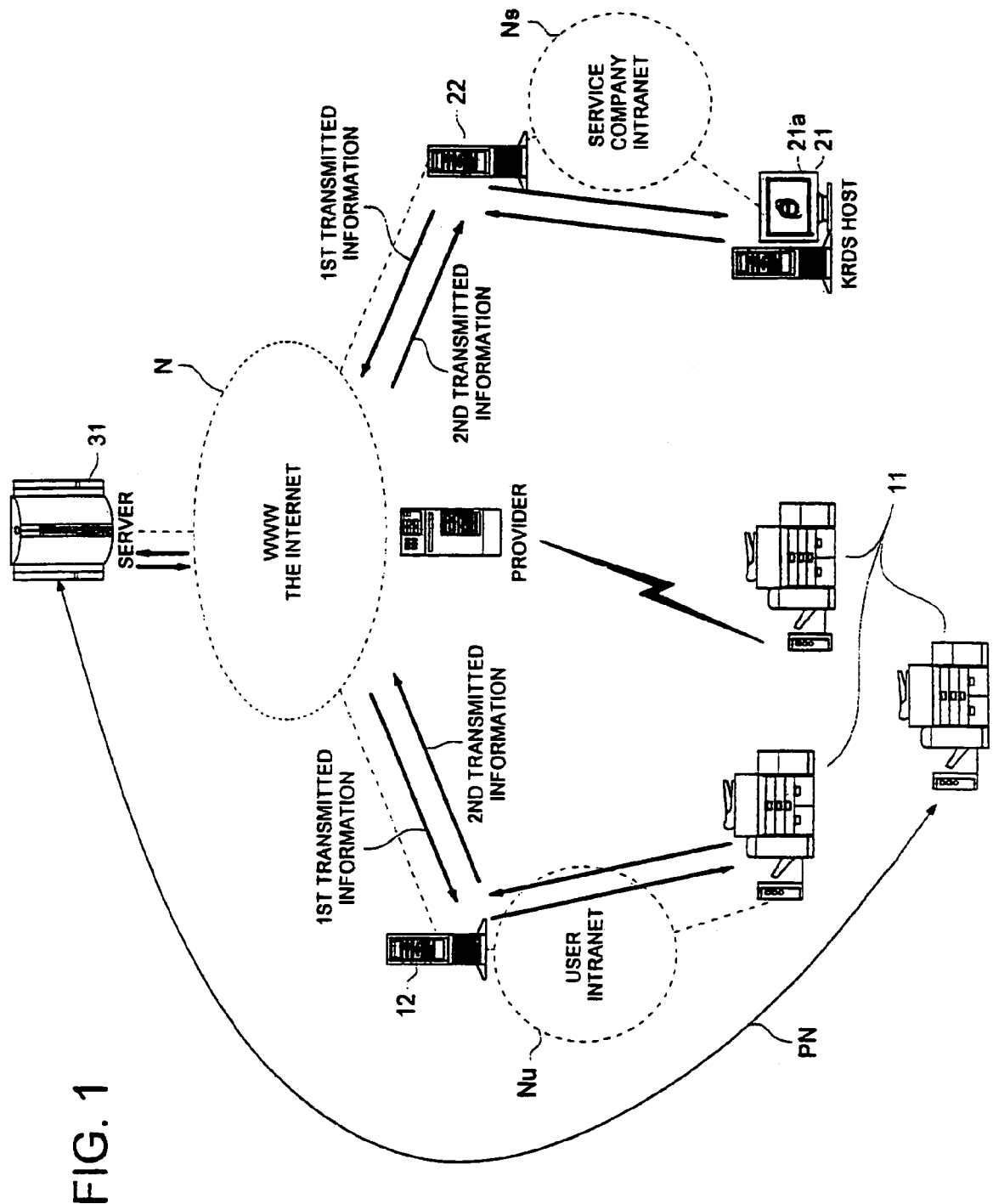
FIG. 1 is a drawing representing the administration system according to the present embodiment.

The following provides a detailed description of the embodiments of the present invention with reference to drawings:

FIG. 1 is a drawing representing the administration system according to the present embodiment;

In FIG. 1, an image forming apparatus 11 as device to be administered including a copier and printer connected to the user Intranet Nu configured in the company of a user is linked to the Internet N outside the company via a proxy server 12 equipped with firewall server function, on the one hand. On the other hand, a host computer 21 connected to the service company Intranet Ns configured in the service company is linked to the Internet N outside the company via a proxy server 22 equipped with firewall server function. Furthermore, a relaying server 31 having a storage means (also called a relaying storage) including a mass storage hard disk is connected to the Internet N in the similar manner. Namely, said image forming apparatus 11 is connected to the user Intranet Nu as a user network different from the Internet N, and is connected to the Internet N via the proxy server 12 as a user firewall server connected to said user network to restrict the passing information. The relaying server 31 is connected to the Internet N outside the user firewall server, as viewed from the user network.

The host computer 21 is connected to the Internet N via the proxy server 22 as a user firewall server which is connected to the Intranet Ns of the service company as a service network different the Internet N and which restricts the passing information. The relaying server 31 is located outside the user firewall server as viewed from the user network and also outside the service firewall server as viewed form the service network, and is connected to the Internet N.

The image forming apparatus 11 forming an image on the recording medium constitutes a device to be administered. It contains (1) a storage under administration such as a memory storing the programs and data, a flash ROM and a hard disk, (2) a detecting means of detecting a trouble such as a sensor, and (3) a decision-making means such as CPU. Said apparatus is controlled according to the program or data retained in the storage to be administered. The host computer 21 constitutes an administration apparatus capable of providing job information. Job information for the embodiment to be described later includes the update information for updating and rewriting of the program stored in the storage to be administered of the image forming apparatus 11 or for rewriting of said data into updated data. Based on the obtained update information, the image forming apparatus 11 can rewrite said program or data stored in the storage to be administered into the updated program or data. Furthermore, the image forming apparatus 11 can also download the update program or data based on the obtained update information and can rewrite the program or data stored in the storage to be administered into the updated program or data. While the image forming apparatus 11 is rewritten into the updated program or data (or during transmission of the second transmitted information to be described later), part of the function thereof cannot utilized sufficiently. So it is preferred to suspend access of the relaying server 31.

The updated program hereunder refers to the upgraded program where bugs of the original program are removed. The updated data refers to the default value to determine image density. To put it more specifically, it includes inherent data shown in FIG. 3. The following describes the case where the image forming apparatus 11 is connected to the Internet N via the user Intranet Ns and proxy server 12. However, it is also applicable to the image forming apparatus 11 connected to the Internet N via a modem connected to the public line (telephone line) for conversion between the digital signal and analog signal and a provider connected to the Internet N via the public line PN. Furthermore, the configuration is preferred to be structured to permit direct exchange of information (by public line) with the image forming apparatus 11 equipped with a modem connected to the public line PN for conversion between digital signals and analog signals (image forming apparatus not connected to the Internet N) so that that the relaying server 31 can provide services also to said image forming apparatus 11.

The host computer 21 of the service company reads information from the image forming apparatus 11 to be kept informed of a trouble or the time for maintenance. However, since proxy servers 12 and 22 has a firewall server function, it is difficult to access the image forming apparatus 11 or host computer 21 from the outside (from the Internet) to read the data for the reason of security. To solve this problem, a relaying server 31 is provided in the administration system of this embodiment, thereby allowing data exchange between the image forming apparatus 11 and host computer 21.

Namely, proxy servers 12 and 22 often authorize the Intranet Nu and Ns to send or download data. This property is used as follows: When the host computer 21 is to get the inherent data shown in FIG. 3 from the image forming apparatus 11, for example, the host computer 21 sends to the relaying server 31 the job information (1st transmitted information) on the intention to get data from the image forming apparatus 11, and the information is stored there. When the image forming apparatus 11 accesses the relaying server 31, it reads the job information (1st transmitted information) on the intention of the host computer 21 to get data from the image forming apparatus 11, if such information is stored in memory. Then it sends inherent data (2nd transmitted information) and stores it into the relaying server 31. Furthermore, when the host computer 21 accesses the relaying server 31, it can read the inherent data (2nd transmitted information and device data information) transmitted from the image forming apparatus 11 if it is stored in the memory.

Namely, such a job information becomes transmission command information to be used when the image forming apparatus 11 sends 2nd transmitted information (inherent data) to the relaying server 31. The image forming apparatus 11 can send the 2nd transmitted information to the relaying server 31 based on transmission command information in the obtained 1st transmitted information. The relaying storage of the relaying server 31 is preferred to memorize multiple pieces of the first transmitted information.

As described above, data transmission is enabled without the image forming apparatus 11 and host computer 21 making a direct access. This makes it possible for the host computer 21 to provide appropriate monitoring of the image forming apparatus 11, independently of the presence or absence of firewall server. FIG. 3 shows an example of the 2nd transmitted information. At least one piece of the following usage history information can be cited as an example;

(1) image formation count (total count in FIG. 3), (2) the usage count of at least one component (photosensitive drum, etc.) constituting the image forming apparatus 11 (drum count, optional replacement parts count, regular replacement parts count, etc.), (3) image formation count for each size of the recording medium (count by the size of paper (recording medium)), (4) image-formed recording medium count (recording medium count), and (5) image formation count for each function (mode) owned by the image forming apparatus 11 (count for each user usage mode, copy, printer, fax, count for each scanner, etc.). The 2nd information can be emergency information based on the errors having occurred in the image forming apparatus 11 (emergency/regular call information in FIG. 3) and error information (JAM/SC information).

Namely, when an error has been detected by the detecting means in the image forming apparatus 11 and decision-making means has determined that an error detected by said detecting means requires urgent attention, it sends emergency information to the relaying server 31. Such an emergency information is read by the host computer 21 having accessed the relaying server 31. This allows the service company to be notified of an error having occurred to the image forming apparatus 11. Such operations will be described later with reference to FIG. 5.

Furthermore, the image forming apparatus 11 is administered by the host computer 21 connected to the Internet N, and has a relaying storage to memorize the first transmitted information to be transmitted to the image forming apparatus 11 by the host computer 21. Further, it accesses the relaying server 31 connected to the Internet N via the Internet N to obtain the first transmitted information memorized in the relaying storage. At the same time, it utilizes the obtained first transmitted information to update the program and data. So control operation can be changed based on it. Namely, the control operation of the image forming apparatus 11 be changed from the place away from the image forming apparatus 11 (e.g. service company). This is a great advantage.

Transmitted information can be identified by attaching the object device ID information (a serial number, to put it specifically) unique to the image forming apparatus 11 and host computer 21, despite the presence of multiple image forming apparatuses 11 and host computers 21 with a single relaying server 31. This allows exchange of transmission between a specific image forming apparatus 11 and specific host computer 21.

The Object device ID information specifying the image forming apparatus 11 at the destination of transmission is included in the first transmitted information. This allows the image forming apparatus 11 to access the relaying server 31 to determine if the first transmitted information should be obtained or not, based on the Object device ID information. If it has determined that said information should be obtained, the first transmitted information memorized in the relaying storage of the relaying server 31 is obtained.

Furthermore, the host computer 21 having sent the first transmitted information or the image forming apparatus 11 having sent the second transmitted information accesses the relaying server 31 in order to make sure if the first or second transmitted information is correctly received by the relaying server 31 or not after transmission. Then it can make sure of correct transmission of information. This is a great advantage.

In such a case, the host computer 21 having sent the first transmitted information or the host computer 11 having sent the second transmitted information accesses the relaying server 31, and makes sure if the first or second transmitted information is correctly received by the relaying server 31 or not. If it is not correctly received, it sends the first or second transmitted information again, thereby ensuring more reliable exchange of information.

The host computer 21 or image forming apparatus 11' accesses the relaying server 31 at one or more of the timing conditions; at specified time intervals, at a specified time of the day, at a specified timing or at a timing which meets the specified conditions. "Specified time" refers to the predetermined time, for example, time of the day, day of the week, and day of the month. "Specified timing" means the time when the device to be administered is started (power ON) or when the specified operation is started. "Time interval meeting the specified conditions" signifies the time when the image formation count has reached a preset count or the preset error information in detected error information has been detected. In the embodiment described below, the host computer 21 or image forming apparatus 11 accesses the relaying server 31 at specified time intervals. According to the present embodiment, the host computer 21 makes an access every 10 minutes and the image forming apparatus 11 every 15 minutes. Namely, the time between regular access of the image processor 11 to the relaying server 31 and the next regular access is longer than the time between a regular access of the host computer 21 to the relaying server 31 and the next regular access. If access interval of the host computer 21 is shorter that of the image forming apparatus 11, quick information can be obtained when there is emergency information from the side of the image forming apparatus 11, for example. This is advantageous. The access interval of the image forming apparatus 11 can be changed, for example, from the operation unit of the image forming apparatus 11, the personal computer connected to the user network or the host computer.

Figure 2:
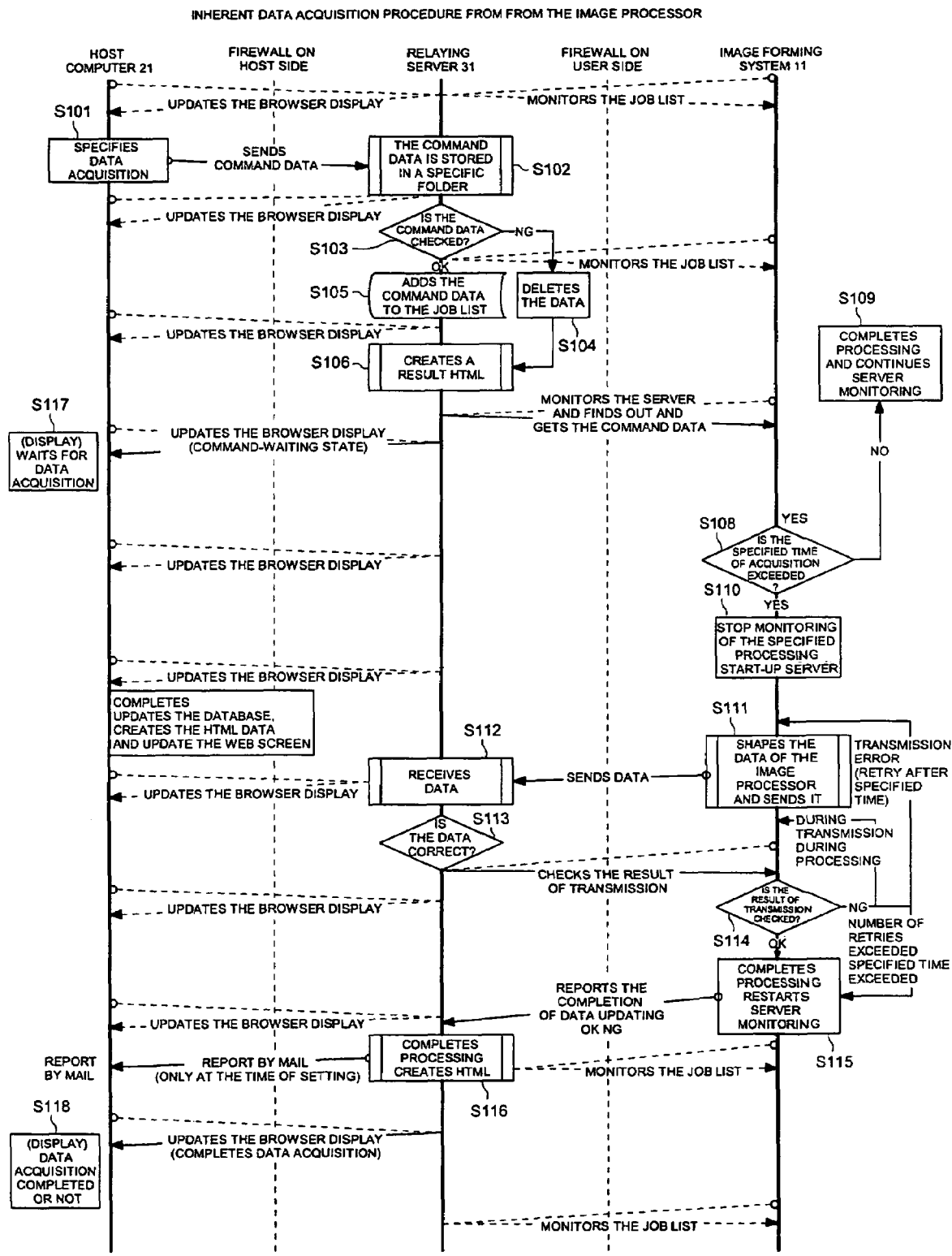
FIG. 2 is a ladder diagram representing data transmission between image forming apparatus 11 and host computer 21.
Figure 9:
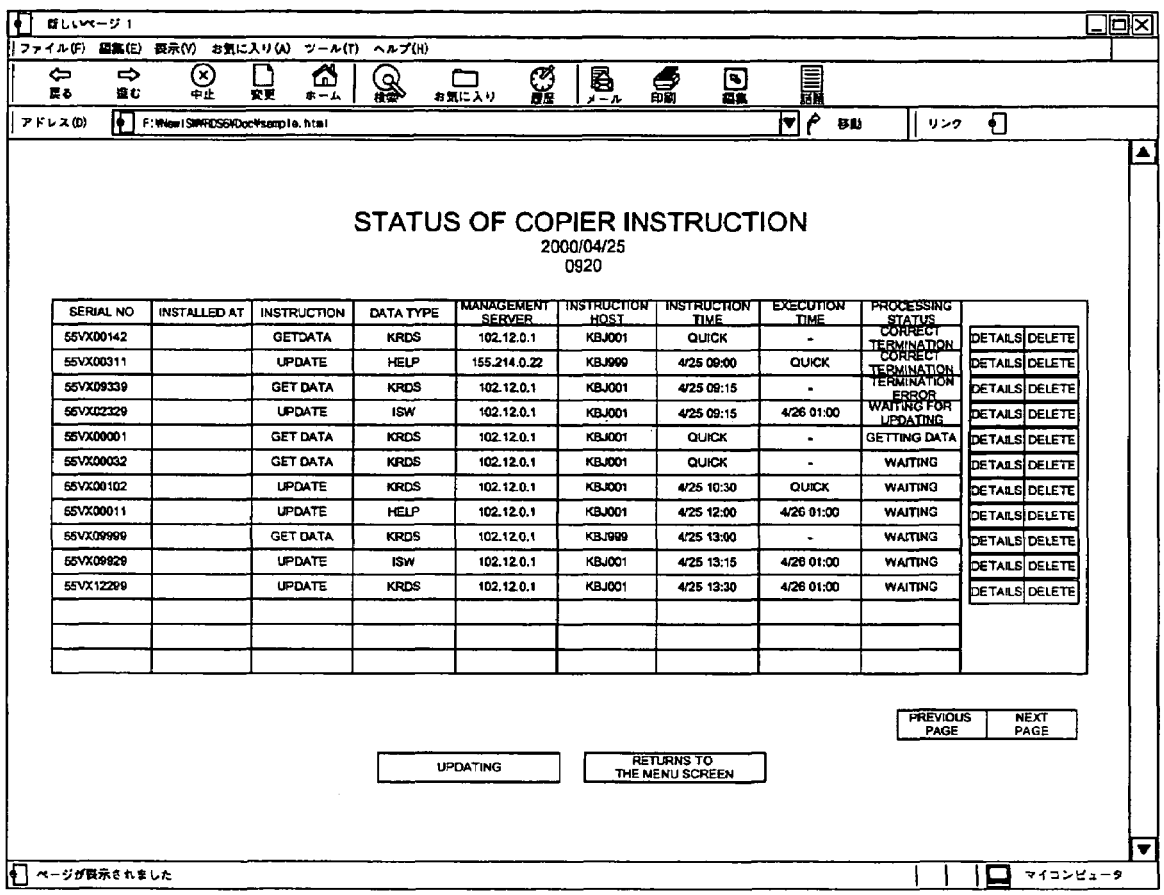
FIG. 9 is a drawing showing an example of the job list.

The following describes the exchange of data between the image forming apparatus 11 and host computer 21 more specifically. FIG. 2 is a ladder diagram representing exchange of data between image forming apparatus 11 and host computer 21. It shows the case when inherent data is obtained from the image forming apparatus 11. FIG. 3 is a drawing representing an example of inherent data. FIG. 9 is a drawing showing an example of the job list stored in the relaying storage displayed on the display unit on the side of the host computer 21. (Details will be discussed later).

The image forming apparatus 11 makes a regular access to the relaying server 31, and monitors the command (the first transmitted information and job information) written in the relaying storage. The host computer 21 makes a regular access to the relaying server 31 to update the information indicated on the display unit.

In Step S101 shown in FIG. 2, command data (first transmitted information, job information and transmitted command information) representing the intention of obtaining inherent data from the image forming apparatus 11 (namely, reception of the inherent data) is sent from the host computer 21 to the relaying server 31 by the operation of the service personnel. Such command data contains the ID information of the image forming apparatus 11 as an object device and the time of day for implementation (time when the inherent data is sent to the relaying server 31 by the image forming apparatus 11) as required.

In Step S102, the relaying server 31 stores the received command data in the specific area of the relaying storage. Then in Step S103, confirmation is made to check if received command data is normal or not. If such command data is not correct, it is deleted in Step S104. In the meantime, if the command data is normal, the command data of the inherent data is written into the job list by the relaying server 31 in Step S105, and is stored in the inherent folder corresponding to the serial number inherent to the image forming apparatus 11 (Object device ID information). The result is converted into the format such as HTML, XML and FTP, and the system waits for access from the image forming apparatus 11 and host computer 21. At the time of the next access, the host computer 21 reads out the data from the relaying server 31 and displays waiting for data acquisition or command data error in its own display unit 21a (FIG. 1) (Step S117).

Namely, the relaying server 31 changes the information indicated on the display unit 21a of the host computer 21, depending on whether the first transmitted information is obtained or not by the image-forming apparatus 11, and whether the image forming apparatus 11 performs the specified operation based on the first transmitted information or not. The host computer 21 makes a regular access to the relaying server 31 at a specified time interval to get information to be indicated on the display unit 21a of the host computer 21, and the information is indicated on the display unit 21a, thereby making it possible to administer the status of the image forming apparatus 11. An example of indication on the display unit 21a will be described later with reference to FIG. 9.

After that, the image forming apparatus 11 accesses the relaying server 31 and checks the inherent folder corresponding to the inherent serial number (Object device ID information) in the job list. When it has found out command data to itself, it gets the command data and determines if the time (time for implementation) has elapsed or not (Step S108). If it is determined that the specified time has not yet elapsed, the image forming apparatus 11 terminates processing and resumes periodic access to the relaying server 31 (Step S109).

By contrast, if it is determined that the specified time has elapsed, the image forming apparatus 11 suspends a regular access of the relaying server 31 (Step S110), and focuses on execution of the obtained command. To put it more specifically, the image forming apparatus 11 converts its own inherent data into a specified format of the protocol which can pass through the user's firewall server such as HTML, XML and FTP in Step S111, and sends the result to the relaying server 31 as the second transmitted information (device data information).

In the meantime, the relaying server 31 receives the inherent data transmitted from the image forming apparatus 11 (Step S112), and determines in the following Step S113 if the data is correctly sent or not. The result is written into the relaying storage. After transmitting inherent data, the image forming apparatus 11 accesses the relaying server 31 subsequent to the lapse of a specified time, and checks the result of data transmission. If the result of transmitting the received data is incorrect in Step S114, the image forming apparatus 11 goes back to Step S111 again to send the data again. If the result of data transmission is inadequate, transmission of the inherent data based on the command data terminates in Step S115, and a regular access of the relaying server 31 restarts.

When transmission has terminated (including the case when the data transmission is not possible in the final stage, for example, when data transmission is repeated several times, the preset number of times has been exceeded, or the preset time has been exceeded), a report on the termination of data transmission (a report notifying the termination of the specified operation; OK if data can be transmitted and NG if it cannot) is sent from the image forming apparatus 11 to the relaying server 31. The relaying server 31 writes the data on correct termination or the data on the failure of data transmission in the specified area according to the report on the completion of data transmission sent from the image forming apparatus 11 (Step S116 with reference to FIG. 9). In the case of correct termination, the inherent data of the transmitted image forming apparatus 11 is stored in the specified area of the relaying storage so that it can be loaded from the host computer 21. If communications by mail have been set, report can be immediately sent to the host computer 21. This is preferred because earlier reporting to the host computer 21 is ensured (further, if multiple addresses are set, simultaneous transmission is possible by multiple host computers 21 and service persons). However, when the host computer 21 accesses the relaying server 31 next time, the display unit 21a of the host computer 21 will indicate whether transmission of the image forming apparatus 11 based on the command data has correctly terminated or not (Step S118). Further, if correct termination has been made, the inherent data of the image forming apparatus 11 stored in the relaying storage can be read out, displayed on the display unit or downloaded.

The following describes the case of updating the inherent data of the image forming apparatus 11: FIG. 4 is a ladder diagram representing exchange of data between image forming apparatus 11 and host computer 21. It shows the case of updating inherent data on the side of the image forming apparatus 11.

In Step S201 shown in FIG. 4, the host computer 21 enters the inherent data (updated data) to be rewritten in response to the operation of the service person, for example. Then the entered inherent data and updated command data (first transmitted information, job information and updated information) are sent to the relaying server 311 in Step S202. Such command data contains the Object device ID information of the image forming apparatus 11 and time for implementation (time when the inherent data memorized in the storage to be administered is rewritten into the inherent data to be rewritten, by the image forming apparatus 11), as required.

In Step S203, the relaying server 31 stores the received inherent data and updated command data in the specific range of the relaying storage. Then in Step S204, it checks if received inherent data and updated command data are correct or not. If such an inherent data and updated command data are not correct, they are deleted in Step S205. In the meantime, if the inherent data and updated command data are correct, the relaying server 31 writes the inherent data update command into the job list in Step S206, and stores it in the inherent folder corresponding to the serial number (Object device ID information) inherent to the image forming apparatus 11. The result is converted into the specified format such as HTML, XML and FTP, and said system waits for the access by the image forming apparatus 11 and host computer 21. At the time of the next access, the host computer 21 reads the data from the relaying server 31 and evaluates the result of data transmission (Step S222). In the case of transmission failure, indication to that effect is given on its own display unit 21a (FIG. 1), and the system goes back to the Step S201 to send the data again. If transmission is correct, the host computer 21 gives display of "Updating in progress" or the like (Step S224).

Then the image forming apparatus 11 accesses the relaying server 31 and checks the inherent folder corresponding to the inherent serial number (Object device ID information) in the job list. Further, if it finds out a command data to itself, it gets that command data. If it finds out a update command data at the time of checking, it gets that data. The image forming apparatus 11 determines if the specified time (time for implementation) has elapses or not (Step S209). If it determines that the specified time has not yet elapsed, the image forming apparatus 11 terminates processing and resumes regular access to the relaying server 31 (Step S210).

By contrast, if it is determined that the specified time has elapsed, the image forming apparatus 11 suspends a regular access of the relaying server 31 (Step S211), and focuses on execution of the obtained command. To put it more specifically, the image forming apparatus 11 converts its own inherent data (all the inherent data may be sent, but part of the data, namely, only the inherent data to be updated can also be sent) into a specified format of the protocol such as HTML, XML and FTP in Step S111, and sends the result to the relaying server 31.

In the meantime, the relaying server 31 receives the inherent data transmitted from the image forming apparatus 11, and rewrites it according to the inherent data sent from the host computer 21 (Step S213). The rewritten inherent data are converted into the specified format such as HTML, XML and FTP and are stored in the relaying server 31. The result of evaluating whether transmission of data from the image forming apparatus 11 is correct or not is sent from the relaying server 31 to the image forming apparatus 11. So in Step S214, the image forming apparatus 11 goes back to Step S212 again if the result of data transmission is evaluated as faulty, and sends the data again. If the result of data transmission is correct, the image forming apparatus 11 accesses the relaying server 31 in Step S215 to obtain the rewritten inherent data, and updates the inherent data in the ensuring Step S216. In Step S217, it is determined whether the result of data transmission is correct or not. In Step S218, the result of updating is reported to the relaying server 31, and updating procedure terminates in Step S220. Then regular access to the relaying server 31 starts.

When updating procedure has terminated (including the case when final updating is not possible, for example, when updating is repeated several times, the preset number of times has been exceeded, or the preset time has been exceeded), a report on the termination of data updating (a report notifying the completion of the specified operation; OK if data can be updated and NG if it cannot) is sent from the image forming apparatus 11 to the relaying server 31. In the relaying server 31, whether updating has terminated correctly or not is written in the specified area, in response to the data transmission termination report sent from the image forming apparatus 11 (Step S219, FIG. 9). This information is stored in the specified area of the relaying storage so that it can be downloaded from the host computer 21. If communications by mail have been set, quick communication with the host computer 21 can be achieved, making it possible to send the report earlier to the host computer 21 (further, simultaneous transmission to multiple destinations such as the host computer 21 and service person can be achieved by setting of multiple addresses); this is preferred. However, when the host computer 21 makes access to the relaying server 31 next time, the display unit 21a of the host computer 21 indicates whether updating the inherent data of the image forming apparatus 11 based on the updated command data has terminated correctly or not (Step S225). This is shown on the display unit of the host computer 21.

As described above, according to such an embodiment, a service person can read out the inherent data of the image forming apparatus 11 of the user while he stays in the service company. If required, he can rewrite it. This signifies a substantial reduction in the labor and cost. In the present example, rewriting (updating) of inherent data is performed by the relaying server, but the inherent data may be rewritten by the image forming apparatus 11, similarly to rewriting of the program to be described later.

The following describes data transmission when a trouble has occurred to the image forming apparatus 11. FIG. 5 is a ladder diagram representing exchange of data between image forming apparatus 11 and host computer 21. It shows that a trouble has occurred on the image forming apparatus 11. In the embodiment discussed below, the details of the trouble are verified, and a regular access to the relaying server 31 is suspended if it is serious. The regular access may be suspended immediately when the occurrence of a trouble is detected.

In Step S301 of FIG. 5, when the image forming apparatus 11 has detected occurrence of some trouble through a detecting means, the back panel (not illustrated) displays that a trouble has occurred, in Step S302. It suspends the execution if during image formation. Furthermore, the image forming apparatus 11 executes self-diagnostic program by the decision-making means in Step S303 to determine if the trouble having occurred is a temporary trouble such as such as paper jamming or a serious trouble due to motor failure, etc. If the trouble is determined to be temporary, the image forming apparatus 11 works in response to the operation of removing the jammed paper and recovers the operation, without reporting to the outside, in Step S304.

If the trouble is determined as serious, the image forming apparatus 11 suspends a regular access to the relaying server 31 in Step S305. Obtaining information on the trouble in Step S306, it sends it to the relaying server 31. In this case, the image forming apparatus 11 sends target device ID information as well. In Step S307, the relaying server 31 stores the received information on the details of the trouble in the specified area. A specified period of time after having sent the information on the details of the trouble, the image forming apparatus 11 accesses the relaying server 31 and verifies the result of data transmission.

If the image forming apparatus 11 determines that the result of transmission is faulty in Step S308, it goes back to Step S306, and send the data again. If the result of data transmission is correct, the image forming apparatus 11 reports termination of processing in Step S309, and accesses the relaying server 31 notifies that a trouble has occurred. The order of Steps S306 and S309 may be reversed. Transmission of data in Step S306 may be performed simultaneously with the operation in Step S309. Information that a trouble has occurred (Step S309) and information on the details of the trouble (Step S306) belong to the second transmitted information, which is emergency information. These pieces of information are sent in a specified format such as HTML, XML or FTP. After that, the image forming apparatus 11 resumes a regular access of the relaying server 31 in Step S311, and uses the relaying server 31 to monitor whether or not there is a new command issued from the host computer 21.

If setting is made to allow report by mail, the relaying server 31 having received a report can send information to the host computer 21 in the earlier phase by establishing an immediate communication with the host computer 21 (further, simultaneous transmission to multiple destinations such as the host computer 21 and service person can be achieved by setting multiple addresses); this is preferred. However, when the host computer 21 makes access to the relaying server 31 next time, information on the trouble having occurred to the image forming apparatus 11 and the details of the trouble will be read out, and emergency notice will appear on the display unit of the host computer 21 (Step S312).

As described above, according to the present embodiment, when a trouble has occurred to the image forming apparatus 11, the details of the trouble are specifically reported to the service company, so that the service person can take immediate actions to solve the problem.

The following describes the case of updating the program stored in the image forming apparatus 11: FIG. 6 is a ladder diagram representing exchange of data between image forming apparatus 11 and host computer 21. It shows the case of updating the program on the image forming apparatus 11.

In Step S401 of FIG. 6, in response to the operation of the service person for example, the host computer 21 enters the program to be rewritten (updating program, called ISW data). Then the entered ISW data and update command data (the first transmitted information, job information and updating information) are sent to the relaying server 31 (Step S407). The target device ID information of the image forming apparatus 11 and time for execution (time of day when the image forming apparatus 11 rewrites the program kept in the storage under administration into ISW data) are included in this update command data, as required.

In Step S402, the relaying server 31 stores the received ISW data and update command data in the specified area of the relaying storage. Then in Step S403, it checks if the received ISW data and update command data are correct or not. If said ISW data and update command data are not correct, they are deleted in Step S404. If said ISW data and update command data are correct, the relaying server 31 writes the ISW data updating command in the job list in Step S405, and stores it into the inherent folder corresponding to the serial number inherent to the image forming apparatus 11 (ID information of the target device). The result is converted into the specified format such as HTML, XML and FTP and the system waits for access by the image forming apparatus 11 and the host computer 21 (Step S406). The host computer 21 reads out the data from the relaying server 31 in the next access and evaluates the result of data transmission (Step S408). If transmission is faulty, indication to that effect is given on its own display unit 21a (FIG. 1), and the system goes back to the Step S401 to send the data again. If transmission is correct, the host computer 21 gives display of "Updating in progress" or the like (Step S410).

After that, the image forming apparatus 11 accesses the relaying server 31 and checks the inherent folder corresponding to the inherent serial number (Object device ID information) in the job list. If it finds out a command data to itself, it gets that command data. The image forming apparatus 11 checks if the specified time (time of day for implementation has elapsed or not (Step S412). If it has determined that the specified time has not yet elapsed, the image forming apparatus 11 terminates processing and resumes regular access to the relaying server 31 (Step S413).

If it has determined that the specified time has elapsed, the image forming apparatus 11 suspends regular access to the relaying server 31 (Step S414), and focuses on execution of the obtained command. To put it more specifically, the image forming apparatus 11 accesses the relaying server 31 in Step S415 and downloads the stored ISW data.

Further, if the image forming apparatus 11 determines that the result of ISW data transmission is incorrect in Step S416, it goes back to Step S415 and performs downloading again.

When the downloading information has been completed (including the case when final downloading is not possible, for example, when downloading is repeated several times, the preset number of times has been exceeded, or the preset time has been exceeded), the report on the result of ISW data acquisition (notification on the termination of a specified operation) is sent from the image forming apparatus 11 to the relaying server 31 (Step S417). In response to the report on the result of data transmission sent from the image forming apparatus 11, the relaying server 31 writes in a specified area the result of updating in the image forming apparatus 11 (Step S418). When the host computer 21 makes access to the relaying server 31 next time, the result of updating in the image forming apparatus 11 will be read out, and will be indicated the display unit of the host computer 21 (Step S419).

On the other hand, the image forming apparatus 1 resumes regular access to the relaying server 31 after reporting the result of data transmission. At the same time, when the time of day specified has been reached in Step S420, the ISW data is written in Step S421 and the program is updated. Here the system waits for the specified time of day. This is because ISW data is written in the time zone when the image forming apparatus 11 is least likely to be operated, for example, at midnight and in the early morning, thereby ensuring that there is no interference with user's operation time.

After that, the image forming apparatus 11 checks in Step S422 to determine if writing has been performed correctly or not. If writing is determined not to have been performed correctly, the system goes back to Step S421, and writing is performed again. If writing is determined to have been performed correctly, the image forming apparatus 11 reports the result of rewriting to the relaying server 31 in Step S423.

When writing of the ISW data has terminated (including the case when writing is not possible in the final stage, for example, when writing is repeated several times, the preset number of times has been exceeded, or the preset time has been exceeded), a report on the result of writing (notification of the termination of ISW rewriting) is sent from the image forming apparatus 11 to the relaying server 3. In response to the report on the result of writing sent from the image forming apparatus 11, the relaying server 31 writes in a specified area the result of updating in the image forming apparatus 11 (Step S424). If setting is made to allow report by mail in this case, it is possible to establish an immediate communication with the host computer 21, and to send the information to the host computer 21 in the early phase (further, simultaneous transmission to multiple destinations such as the host computer 21 and service person can be achieved by setting multiple addresses); this is preferred. However, when the host computer 21 makes access to the relaying server 31 next time, the updated results of the image forming apparatus 11 will be read out, and will appear on the display unit of the host computer 21 (Step S425).

Figure 7:
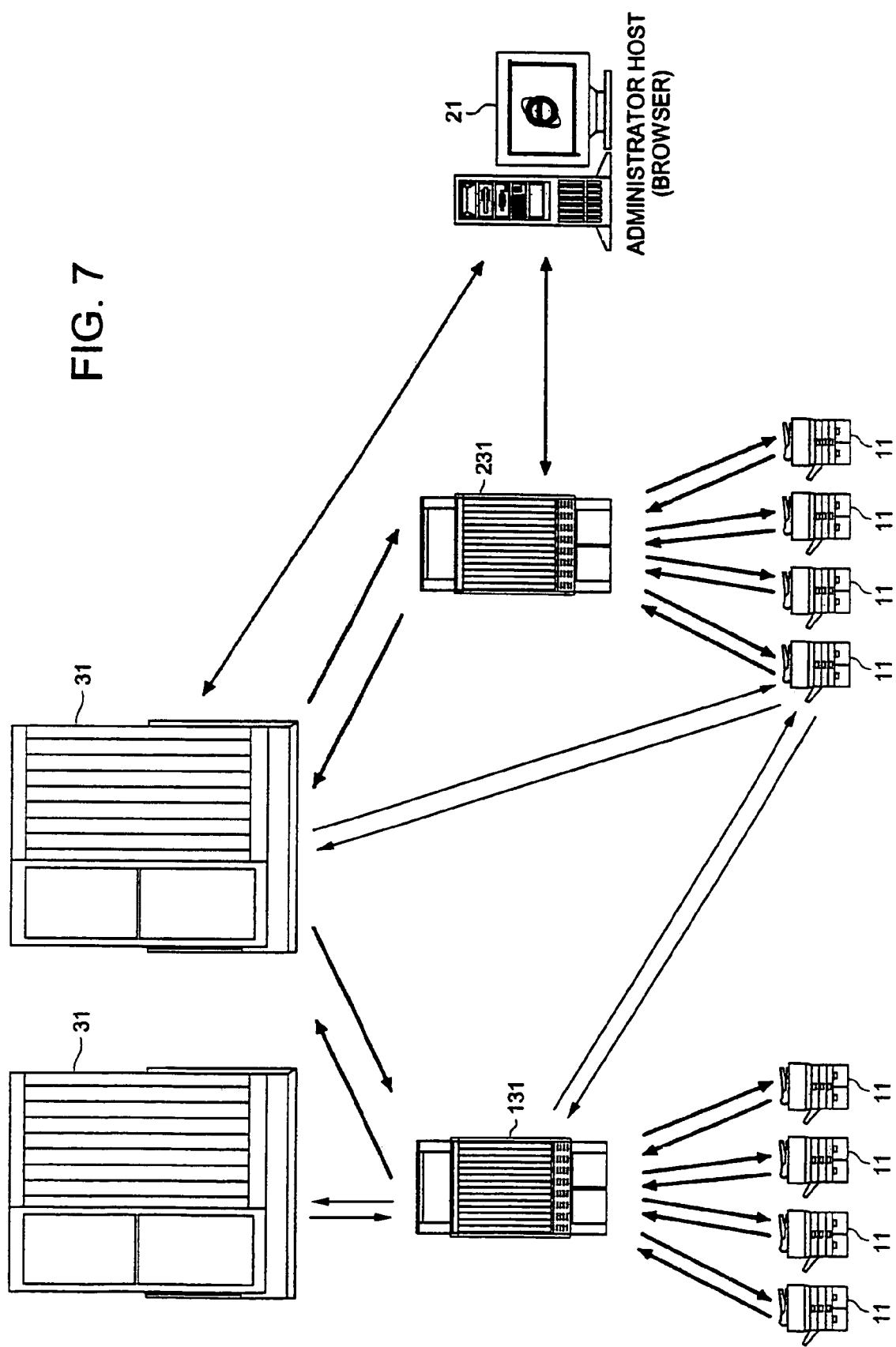
FIG. 7 is a drawing illustrating another example of an administration system including the hierarchically constituted server group.

The above description has been made in three parts; transmission of inherent data (FIG. 2), rewriting of inherent data (FIG. 4) and rewriting of ISW data (FIG. 6). When viewed from the image forming apparatus 11, it accesses the relaying server 31 at specified time intervals, and determines if the job information as the first transmitted information to itself (inherent data transmission command, inherent data rewriting command and ISW data rewriting command) is present or not. If it is present, operations in conformity to the above-mentioned FIGS. 2, 4 and 6 are performed in response to the details of that job information (the operations are changed). If there is only one server, the entire administration system may become faulty, for example, when the communications line is busy for example, or a trouble has occurred. Such problems are solved in the following embodiment:

FIG. 7 is a drawing illustrating another example of an administration system including the hierarchically constituted server group, wherein a proxy server is not illustrated. In FIG. 7, a parent relaying server 31 is connected to child relaying servers 131 and 231, which are linked to multiple image forming apparatuses 11. The host computer 21 is connected to the relaying server 31 and child relaying servers 131 and 231. The parent relaying server 31 as a relaying server and child relaying servers 131 and 231 each are equipped with a relaying storage.

According to the present embodiment, when data is sent from the image forming apparatus 11 to the host computer 21, image forming apparatus 11 accesses child relaying servers 131 and 231 to exchange data. Child relaying servers 131 and 231 access the parent relaying server 131 to exchange data. The host computer 21 can access the parent relaying server to download the data. This procedure can be reversed to send data from the host computer to the image forming apparatus According to the present embodiment, provision of multiple relaying servers prevents access from the image forming apparatus 11 from being concentrated on the parent relaying server 31. This eliminates the possibility of the line being busy. Furthermore, even when the child relaying server 231 gets faulty, for example, child relaying server 131 or parent relaying server 31 play their role in their stead, thereby eliminating the possibility of the entire administration system becoming faulty. It goes without saying that the hierarchical structure of the server is not restricted to two stage; three or more stages are also acceptable. Furthermore, installation of multiple parent relaying servers is also possible. In such a case, setting is prearranged so that the child relaying server will access the preset specific (the first) parent relaying server out of multiple parent relaying servers. When access to the first parent relaying server it disabled, the possibility of partial failure of the system can be eliminated by allowing access to the second parent relaying server different from the first parent relaying server.

In such a case, the image forming apparatus 11 accesses a preset child relaying server (131 or 231) out of multiple relaying servers 131, 131 and 231. At the same time, if access to the child relaying server (131 or 231) is disabled, access to the parent relaying server 31 different from the child relaying server (131 or 231) is preferred. To access the preset child relaying server "131 or 231, the inherent IP address of the child relaying server 131 or 231 to be accessed can be stored in the image forming apparatus 11. It is also possible to store it in the Table created to identify IP addresses of the corresponding child relaying servers 131 and 231 according to the child server ID information.

Child relaying servers 131 and 231 are provided with child relaying storages to store information, and the parent relaying server 31 has a parent relaying storage to memorize information. The image forming apparatus 11 accesses the child relaying server 131 (or 231) via the Internet N, and gets the information retained in the child relaying storage, or sends the second transmitted information to the child relaying server 131 (or 231). The host computer 21 access the parent relaying server 31 via the Internet N to get the information retained in the parent relaying storage or to send the first transmitted information to the parent relaying server 31. The first transmitted information sent from the host computer 21 is sent from the parent relaying server 31 to the child relaying server 131 (or 231), and is stored in the child relaying storage of the child relaying server 131 (or 231). Alternatively, the second transmitted information sent from the host computer 21 is sent from the child relaying server 131 (or 231) to the parent relaying server 31, and is stored in the parent relaying storage of the parent relaying server 31.

In the same manner as above, the child relaying server 131 (or 231) accesses (regularly accesses) the parent relaying server 31 at one or more of the following time intervals; at specified time intervals, at a specified time and at a specified timing. It gets the first transmitted information stored in the parent relaying server 31 at the time of regular access, and sends the second transmitted information received according to the contents to the parent relaying server at the time of the next regular access.

If the first transmitted information includes the target device ID information to identify the image forming apparatus 11 at the destination of transmission (serial number in this case) or the child server ID information to identify the child relaying server 131 (or 231) (serial number in this case), then the child relaying server 131 (or 231) accesses the parent relaying server 31. Based on the target device ID information of the image forming apparatus 11 which accesses the child relaying server 131 (or 231) or the child server ID information to identify itself, it determines whether or not it should get the first transmitted information stored in the parent relaying storage. If decision has been made to get it, then it can get the first transmitted information stored in the child relaying storage.

In the meantime, if said first transmitted information is the transmission command information for the image forming apparatus 11 to send the second transmitted information, then the image forming apparatus 11 sends the second transmitted information to the child relaying server 131 (or 231), based on transmission command information obtained via child relaying server 131 (or 231). The child relaying server 131 (or 231) can send the second transmitted to the parent relaying server 31 the information obtained from the image forming apparatus 11.

Furthermore, updating relaying information used to rewrite the relaying program for control of the child relaying server 131 (or 231) into the updating relaying program can be transmitted from the host computer 21 to the parent relaying server 31. In this case, the child relaying server 131 (or 231) accesses the parent relaying server 31 to get the updating relaying information, and can rewrite the relaying program stored in the child relaying server 131 (or 231) into the updating relaying program, based on the obtained updating relaying information. The functions of the child relaying server 131 (or 231) can be improved by such an updating relaying program.

Especially when there are multiple image forming apparatuses 11 which access the child relaying server 131 (or 231), the child relaying server 131 (or 231) integrates multiple second transmitted information sent from the image forming apparatus 11 into the second transmitted information, which can be sent to the parent relaying server 31. Integration under this context signifies arrangement in the order of transmission, or arrangement in conformity to each image forming apparatus, but is to restricted thereto.

Furthermore, there are multiple child relaying servers 131 and 231. The forming apparatus 11 accesses the preset first child relaying server 131 out of multiple child relaying servers 131 and 231. At the same time, if access to the first child relaying server 131 is disabled, it accesses the child relaying server 231 or parent relaying server 31 different from the first child relaying server 131, thereby ensuring information to be sent.

Furthermore, the parent relaying server 31 is capable of integrating multiple pieces of transmitted information sent from the multiple child relaying servers 131 and 231 into the second transmitted information.

More than one parent relaying server 31 may be provided. In this case, child relaying servers 131 and 231 access the preset first parent relaying server out of multiple parent relaying servers 31. At the same time, if access to said first parent relaying server is disabled, it is capable of accessing the parent relaying server different from said first parent relaying-server; The following provides a specified description of the administration systems equipped with multiple relaying servers.

Figure 8:
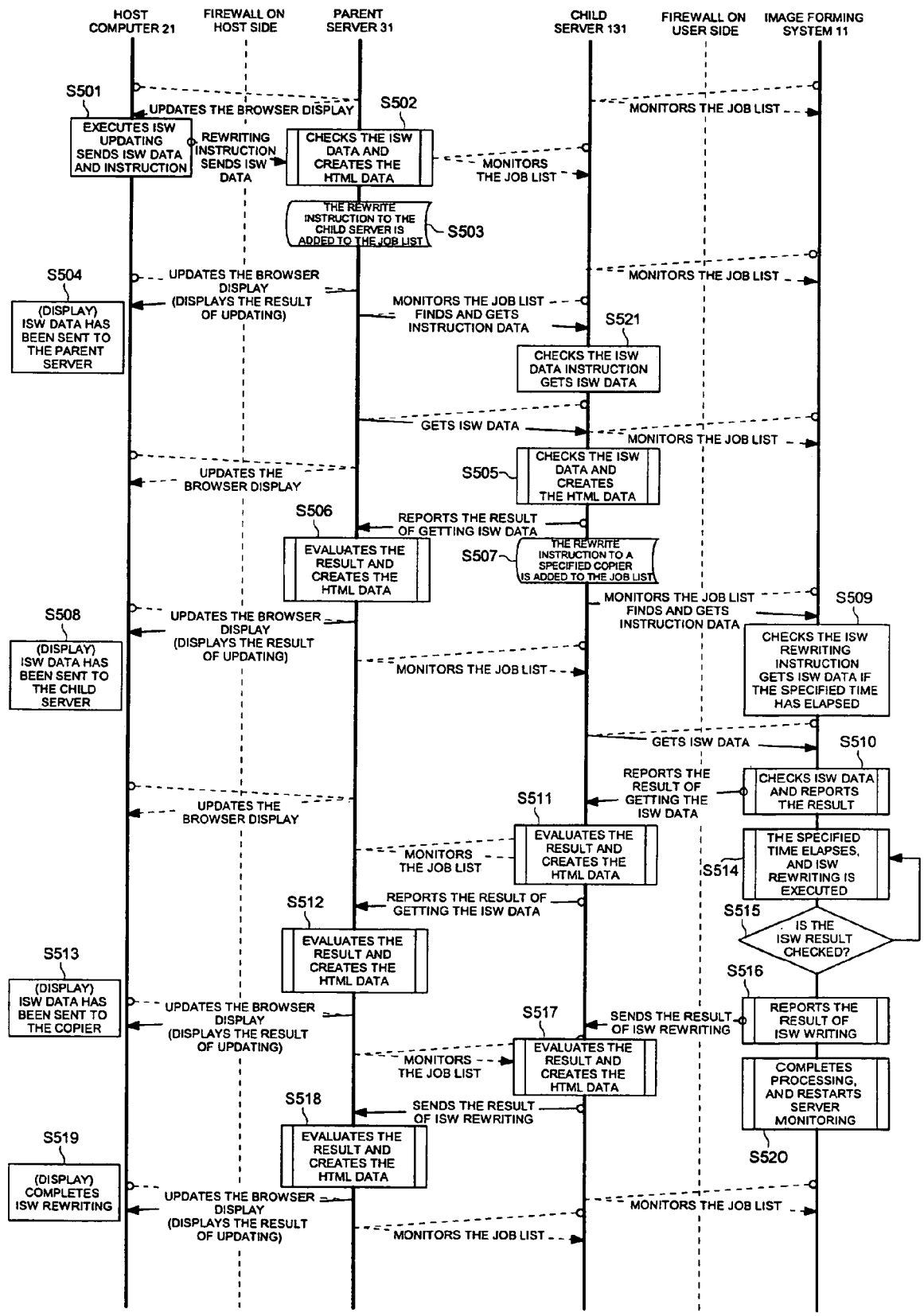
FIG. 8 is a ladder diagram representing exchange of data between image forming apparatus 11 and host computer 21.

FIG. 8 is a ladder diagram representing exchange of data between image forming apparatus 11 and host computer 21 through the parent/child servers. It shows the case of changing the program on the side of the image forming apparatus 11. The child relaying server 131 makes a regular access to the parent relaying server 31 to monitor the job list. The image forming apparatus 11 makes a regular access to the child relaying server 131 to monitor the job list. In the embodiment discussed below, when the host computer 21 is used as an administration system, the equipment to be administered is used as an image forming apparatus 11. It can also be used as a child relaying server 131. This means that the control program can be changed based on the child server ID information to identify the child relaying server 131, similarly to the cases of other embodiments. The following describes the rewriting of ISW data as an example. It goes without saying that this applies to the transmission of inherent data (FIG. 2), rewriting of inherent data (FIG. 4) and emergency report (FIG. 5), as described above.

In Step S501 of FIG. 8, in response to the operation of the service person for example, the host computer 21 enters the program to be rewritten (updating program, called ISW data). Then the entered ISW data and update command data are sent to the relaying server 31 (Step S501). Such an update command data includes the target device ID information of the relevant image forming apparatus 11, the child server ID information of the relevant child relaying server 131 (information to identify the child relaying server) and time for execution, as required.

In Step S502, the parent relaying server 31 stores the received ISW data and update command data in the specific area. Then in Step S503, the rewrite command for the image forming apparatus 11 having passed through the child relaying server 131 is added to the job list. The system waits to be accessed by the child relaying server 131 and host computer 21 (Step S503). The host computer 21 reads data from the parent relaying server 31 in the next access, evaluate the result of data transmission, and gives displays to show that updating is currently in progress (Step S504).

After that, the child relaying server 131 accesses the parent relaying server 31 and checks the job list. If it finds that update command data is present (from the target device ID information of the image forming apparatus 11 be accessed for the child relaying server 131 and the ID information of its own child server), said server gets that command (in Step 521). Furthermore, the child relaying server 131 checks the received ISW data and update command data, and reports the results of transmission to the parent relaying server 31 (Step S505). After that, such data is stored in the specified area, and the rewrite command for the image forming apparatus 11 is added to the job list. Then said server waits to be accessed by the image forming apparatus 11 (Step S507).

In response to the result of transmission from the child relaying server 131, the parent relaying server 31 converts it into a specified format such as HTML, XML and FTP, and waits to be accessed by the host computer 21. The host computer 21 reads the data from the parent relaying server 31 at the time of subsequent access, and gets the result of data transmission. Then it displays to show the data has been send to the child relaying server 131, for example (Step S508).

In the meantime, the image forming apparatus 11 having accessed the child relaying server 131 checks the job list. If it finds out that the update command data is present, it obtains that data and suspends monitoring of the child server 31 (Step S509). Furthermore, the image forming apparatus 11 checks the received ISW data and update command data, and reports the result of transmission to the child relaying server 131 (Step S510).

The result of such transmission is sent through the child relaying server 131 and parent relaying server 31 (Steps S511 and S512) and is read by the host computer 21. Then display is given to show that the data has been sent to the image forming apparatus 11, for example (Step S513).

After waiting until the specified time in Step S514, the image forming apparatus 11 writes the ISW data and updates the program. Then the image forming apparatus 11 determines whether writing is correctly performed or not in Step S515. If it determines that writing is not correct, it goes back to the Step S514 to perform writing again. If writing is correct, the image forming apparatus 11 reports the result of writing to the child relaying server 131 in Step S516. Then in Step S520, the image forming apparatus 11 completes processing of writing, and restarts to monitor the child relaying server 131.

ISW data writing may be disabled in the final phase in some cases. The result of writing including such cases is sent from the image forming apparatus 11 is sent to the host computer 21 through the child relaying server 131 and parent relaying server 31 (Steps S517 and S518), and is read by said host computer 21. Then said result is indicated on the display unit of the host computer 21 (Step S519).

When updating the program and data stored in the child relaying servers 131 and 231, child relaying servers 131 and 231 can get the update program or update data from the host computer 21 in the same manner, thereby permitting the program or data to be updated.

In FIG. 1, the host computer 21 accesses the relaying server 31, and sends the first transmitted information including the job information of causing the image forming apparatus 11 to execute a specified operation and the target device ID information (serial number in this case) to identify the image forming apparatus 11 at the destination. The relaying server 31 stores the first transmitted information sent later in the relaying storage of the relaying server 31. The image forming apparatus 11 determines whether it should obtain the first transmitted information or not, according to the target device ID information of the first transmitted information stored in the relaying storage, when making a regular access to the relaying server 131 at one or more of the following time intervals; at specified time intervals, at a specified time, at a specified timing and at a time interval meeting the specified conditions. If it has determined that it should get it, it obtains the first transmitted information from the relaying server 31. Based on the job information in the first transmitted information, a specified operation is performed. It sends to the relaying server 31 the termination report showing that the specified operation has terminated. Depending on whether the image forming apparatus 11 has obtained the first transmitted information or not, and whether the image forming apparatus 11 has performed the specified operation or not according to the first transmitted information, the relaying server 31 updates the information indicated on the display unit of the host computer 21. The host computer 21 makes a regular access to the relaying server 31 at one or more of the following time intervals; at specified time intervals, at a specified time, at a specified timing and at a time interval meeting the specified conditions. Then said host computer 21 gets the information to be indicated on its own display unit, and indicates it there. In this manner, the status of of the image forming apparatus 11 is administered. For example, when the host computer 21 is installed in a service company at a considerable distance from the image forming apparatus 11, the state of the image forming apparatus 11 is regularly indicated on the display unit through the Internet N. This allows the service personnel to provide adequate administration of the image forming apparatus 11 without leaving his company.

FIG. 9 is a drawing showing an example of the job list indicated on the display unit of the host computer 21. The following defines the items given in the job list:

Serial No.: Serial number of the image forming apparatus 11 (determined uniquely)

Installed at: Where the image forming apparatus 11 is installed

Command: Job commands such as GETDATA (get data), UPDATE (update)

Data type: Type of the data to be obtained or updated by the command (such as KRDS (update) data and ISW data (update program))

Administration server: IP address and domain name of the relaying server 31 managing the jobs (parent relaying server when relaying servers are laid out in hierarchical structure)

Command host: ID information of the host computer 21 issuing the job command (unique host ID information (serial number))

Command time: Command execution time (when the image forming apparatus 11 starts getting the update data in the case of updating the data)

Execution time: Time when image forming apparatus 11 starts updating in the case of updating Processing status: Transactions between the image forming apparatus 11 and relaying server 31 are displayed to show the status of the host. The following describes specific examples:

"Waiting": Waits for access by the copier or for command time

"Getting data": Image forming apparatus 11 waiting for data updating execution time (wherein data are already obtained)

"Correct termination": Correct termination of data processing (display turned off after the lapse of a specified time)

"Termination error": Data processing error (without display being turned off)

The service person gets an accurate picture of the status of multiple image forming apparatuses 11 by regularly observing the display screen given in FIG. 9.

The job list is managed as follows: A folder is created in the hard disk of the host computer 21 or relaying server 31 for each serial number of each image forming apparatus 11, and a required job list can be picked up by searching inside the folder corresponding to the seal number of the image forming apparatus 11 whose status is to be clarified. Furthermore, the image forming apparatus 11 search the inherent folder of the job list from its own inherent serial numbers. The job lists where the execution of the job has terminated can be automatically deleted and corrected.

The above description has been made with reference to the embodiments of the present invention. The interpretation of the present invention should not be restricted to said embodiments alone. It goes without saying that they can be modified and improved.

The present invention provides an administration system and administration method which ensure an accurate-grip of the status of the equipment to be administered, using the network such as the Internet, independently of the presence or absence of firewall server.

What is claimed is:

1. An administration system, comprising:
   a first apparatus, which is located in a first local network and connected to the Internet through a first firewall server of the first local network;
   a second apparatus which is located in a second local network and connected to the Internet through a second firewall server of the second local network; and
   a relaying server which is located outside the first and second local networks and connected to the Internet;
   wherein the first apparatus is configured to transmit first information to the relaying server via the Internet through the first firewall sever without transmitting the first information to the second apparatus via the Internet through the second firewall server;
   wherein the relaying server is configured to receive the first information via the Internet through the first firewall server from the first apparatus, and the relaying server stores the received first information; and
   wherein the second apparatus is configured to access the relaying server via the Internet through the second firewall server without accessing the first apparatus via the Internet through the first firewall server, and obtains from the relaying server at least one of the first information and information relating to the first information.

2. The administration system of claim 1, wherein the second apparatus is configured to access the relaying server repeatedly to obtain the at least one of the first information and the information relating to the first information.

3. The administration system of claim 1, wherein the relaying server comprises a first relaying server and a second relaying server, both of which are located outside the first and second local networks, and
   the first apparatus and the second apparatus are configured to access to the first and second relaying servers, respectively.

4. The administration system of claim 1, wherein the first apparatus is a device and the second apparatus is an administration apparatus to administrate the device.

5. The administration system of claim 4, wherein the first information represents a state of the device.

6. The administration system of claim 4, wherein:
   the administration apparatus is configured to transmit second information to the relaying server via the Internet through the second firewall server without accessing the device via the Internet through the first firewall server; and
   the device is configured to access the relaying server via the Internet through the first firewall server without accessing the administration apparatus via the Internet through the second firewall server, and obtains from the relaying server at least one of the second information and information relating to the second information.

7. The administration system of claim 6, wherein the device controls itself in accordance with the obtained one of the second information and the information relating to the second information.

8. The administration system of claim 7, wherein:
   the second information includes ID information for identifying the device, and job information for making the device execute a predetermined operation; and
   the device, identified with the ID information, executes the predetermined operation in accordance with the job information.

9. The administration system of claim 8, wherein:
   the job information includes at least one of an updating program and updating data for controlling the device;
   the device includes an administrated storage which stores at least one of a program and data; and
   the device rewrites the at least one of the program and the data, stored in the administrated storage, with the at least one of the updating program and the updating data.

10. The administration system of claim 9, wherein the device obtains the at least one of the updating program and the updating data by downloading from the relaying server.

11. The administration system of claim 8, wherein:
    the device is configured to determine whether there is, at the relaying server, any second information including ID information identifying the device itself, and the device obtains the second information, stored in the relaying server, when the second information including ID information identifying the device itself is stored in the relaying server.

12. The administration system of claim 9, wherein the device suspends an access to the relaying server while the at least one of the updating program and the updating data is rewritten in the device.

13. The administration system of claim 6, wherein the administration apparatus is configured to re-transmit the second information when the relaying server fails to receive the second information normally.

14. The administration system of claim 5, wherein the first information comprises inherent data of the device.

15. The administration system of claim 14, wherein the inherent data includes usage history information of the device.

16. The administration system of claim 15, wherein:
    the device is an image forming apparatus which counts at least one of: (1) a number of image formations performed, (2) an amount of usage of at least one component constituting the image forming apparatus, (3) a number of image formations performed for each size of a recording medium, (4) a number of image-formed recording mediums, and (5) a number of image formations performed for each function of the image forming apparatus, so as to obtain a count number; and the image forming apparatus transmits the count number to the relaying server as the inherent data.

17. The administration system of claim 14, wherein the inherent data comprises emergency information based on an error that has occurred in the device.

18. The administration system of claim 17, wherein the device detects an error that has occurred in the device, determines whether the error is a temporary trouble or a serious trouble, and transmits the emergency information to the relaying server when the error is the serious trouble.

19. The administration system of claim 14, wherein the device includes an administrated storage which stores the inherent data to be transmitted to the relaying server in accordance with the at least one of the second information and the information relating to the second information that is previously obtained from the relaying server.

20. The administration system of claim 6, wherein the device suspends obtaining the at least one of the second information and the information relating to the second information from the relaying server while the first information is transmitted to the relaying server.

21. The administration system of claim 14, wherein the device is configured to re-transmit the first information when the relaying server fails to receive the at least one of the first information and the information relating to the first information normally.

22. The administration system of claim 5, wherein the device executes an access to the relaying server according to a predetermined timing.

23. The administration system of claim 22, wherein the predetermined timing is at least one of timing conditions at a predetermined time interval, a predetermined time of the day, at a predetermined timing, and a timing that a predetermined condition is satisfied.

24. The administration system of claim 4, wherein the device transmits a report for notifying a completion of a predetermined operation to the relaying server as the first information; and the administration apparatus obtains a state of the device as the information relating to the first information by accessing the relaying server at a predetermined timing.

25. The administration system of claim 1, wherein the first apparatus is configured to re-transmit the first information when the relaying server fails to receive the first information normally.

26. The administration system of claim 1, wherein the information relating to the first information is created by the relaying server in accordance with the first information.

27. A device to be administrated used in an administration system comprising the device located in a first local network and connected to the Internet through a first firewall server of the first local network, an administration apparatus located in a second local network and connected to the Internet through a second firewall server of the second local network, and a relaying server located outside the first and second local networks and connected to the Internet, the device comprising:

a communication section which repeatedly accesses the relaying server and obtains information stored in the relaying server via the Internet through the first firewall server without accessing the administration apparatus through the second firewall server, the information being at least one of information transmitted from the administration apparatus to the relaying server and information created by the relaying server in accordance with the information transmitted from the administration apparatus to the relaying server; and a control section which controls the device in accordance with the information obtained from the relaying server.

28. The device of claim 27, wherein:

the information stored in the relaying server includes ID information for identifying the device and job information for making the device execute a predetermined operation; and the device, identified with the ID information, executes the predetermined operation in accordance with the job information.

29. The device of claim 28, wherein:

the job information includes at least one of an updating program and updating data for controlling the device;

the device includes an administrated storage which stores at least one of a program and data; and the device rewrites the at least one of the program and the data stored in the administrated storage with the at least one of the updating program and the updating data.

30. The device of claim 29, wherein the device obtains the at least one of the updating program and the updating data by downloading from the relaying server.

31. The device of claim 29, wherein the device suspends an access to the relaying server while the at least one of the updating program and updating data is rewritten in the device.

32. The device of claim 27, wherein the image forming apparatus determines whether there is ID information identifying the device at the relaying server, and obtains the information stored in the relaying server when the ID information identifying the device is stored in the relaying server.

33. The device of claim 27, wherein the information transmitted from the communication section to the relaying server comprises status information representing a state of the device.

34. The device of claim 33, wherein the device re-transmits the status information when the relaying server fails to receive the status information normally.

35. The device of claim 33, wherein the status information is inherent data of the device.

36. The device of claim 35, wherein the inherent data includes usage history information of the device.

37. The device of claim 36, wherein:

the device is an image forming apparatus, which counts at least one of: (1) a number of image formations performed, (2) an amount of usage of at least one component constituting the image forming apparatus, (3) a number of image formations performed for each size of a recording medium, (4) a number of image-formed recording mediums, and (5) a number of image formations performed for each function owned by the image forming apparatus, so as to obtain a count number; and the communication section transmits the count number to the relaying server as the inherent data.

38. The device of claim 35, wherein the inherent data is emergency information based on an error that has occurred in the device.

39. The device of claim 38, wherein the device detects an error that has occurred in the device, determines whether the error is a temporary trouble or a serious trouble, and transfers the emergency information to the relaying server when the error is the serious trouble.

40. The device of claim 35, wherein the device includes an administrated storage which stores the inherent data transmitted to the relaying server in accordance with ID information that is previously obtained from the relaying server.

41. An administration apparatus used in an administration system comprising a device to be administrated located in a first local network and connected to the Internet through a first firewall server of the first local network, the administration apparatus located in a second local network and connected to the Internet through a second firewall server of the second local network, and a relaying server located outside the first and second local networks and connected to the Internet, the administration apparatus comprising:

- a communication section which accesses the relaying server to transmit information to the relaying server, the information including ID information for identifying the device and job information for making the device execute a predetermined operation,
- wherein the device is configured to access the relaying server, via the Internet through the first firewall server without accessing the administration apparatus through the second firewall server, and obtains from the relaying server at least one of the information and edited information created by the relaying server in accordance with the information.

42. The administration apparatus of claim 41, wherein the job information includes at least one of an updating program and updating data for controlling the device.

43. The administration apparatus of claim 42, wherein the administration apparatus re-transmits the information when the relaying server fails to receive the information normally.

44. The administration apparatus of claim 41, wherein the communication section obtains a state of the device by accessing the relaying server at a predetermined timing.

45. A device to be administrated used in an administration system comprising the device located in a first local network and connected to the Internet through a first firewall server of the first local network, an administration apparatus located in a second local network and connected to the Internet through a second firewall server of the second local network, and a relaying server located outside the first and second local networks and connected to the Internet, the device comprising:

- a communication section which accesses the relaying server to transmit information regarding the device to the relaying server via the Internet through the first firewall server without accessing the administration apparatus via the Internet through the second firewall server,
- wherein the administration apparatus is configured to access the relaying server, via the Internet through the second firewall server without accessing the device through the first firewall server, and obtains from the relaying server at least one of the information and edited information created by the relaying server in accordance with the information.

46. An administration apparatus used in an administration system comprising a device located in a first local network and connected to the Internet through a first firewall server of the first local network, the administration apparatus located in a second local network and connected to the Internet through a second firewall server of the second local network, and a relaying server located outside the first and second local networks and connected to the Internet, the administration apparatus comprising:

- a communication section which repeatedly accesses the relaying server, via the Internet through the second firewall server without accessing the device through the first firewall server, and obtains from the relaying server information regarding the device, the information being one of information transmitted from the device and edited information created by the relaying server in accordance with the information.

* * * * *